United States Patent
Bauman et al.

(10) Patent No.: US 6,572,355 B1
(45) Date of Patent: Jun. 3, 2003

(54) WINDOW SASH CONSTRUCTION AND METHOD AND APPARATUS FOR MANUFACTURE THEREOF

(75) Inventors: Randall L. Bauman, Curtice, OH (US); John H. Gillen, Ottawa Lake, MI (US)

(73) Assignee: Libbey-Owens-Ford Co., Toledo, OH (US)

( * ) Notice: Subject to any disclaimer, the term of this patent is extended or adjusted under 35 U.S.C. 154(b) by 21 days.

(21) Appl. No.: 09/679,500

(22) Filed: Oct. 3, 2000

(51) Int. Cl.[7] .............................................. B29C 45/14
(52) U.S. Cl. ........................ 425/112; 249/155; 425/116; 425/123; 425/190; 425/192 R
(58) Field of Search .................................. 249/155, 158; 425/190, 192 R, 112, 116, 123, 129.1

(56) References Cited

U.S. PATENT DOCUMENTS

| | | | |
|---|---|---|---|
| 2,416,559 A | * 2/1947 | Wilson | 249/155 |
| 2,874,442 A | * 2/1959 | Henderson | 249/155 |
| 3,595,516 A | * 7/1971 | Rice | 249/155 |
| 4,249,517 A | 2/1981 | Schroeder et al. | |
| 4,470,534 A | 9/1984 | Janssens et al. | |
| 4,786,456 A | * 11/1988 | Witte | 249/155 |
| 4,789,129 A | * 12/1988 | Sisto | 249/155 |
| 4,822,649 A | 4/1989 | Canaud et al. | |
| 4,909,875 A | 3/1990 | Canaud et al. | |
| 4,951,927 A | 8/1990 | Johnston et al. | |
| 5,033,249 A | 7/1991 | Scheeren et al. | |
| 5,061,531 A | 10/1991 | Catalano | |
| 5,069,852 A | 12/1991 | Leone et al. | |
| 5,372,349 A | * 12/1994 | Elmore | 249/155 |
| 5,662,948 A | * 9/1997 | Sjoberg | 249/155 |
| 5,755,983 A | * 5/1998 | Bordener | 249/155 |
| 5,997,793 A | 12/1999 | Lahnala | |

FOREIGN PATENT DOCUMENTS

| | | |
|---|---|---|
| GB | 2 245 300 | 7/1994 |
| GB | 2 245 861 | 1/1995 |
| WO | WO 99/14169 | 3/1999 |

* cited by examiner

*Primary Examiner*—James P. Mackey
(74) *Attorney, Agent, or Firm*—Marshall & Melhorn, LLC

(57) ABSTRACT

A homogeneous sash or fenestration unit is shown which may be made of a wide variety of materials, and holds a first and a second pane of glazing material in a parallel, spaced apart, relationship without the use of spacers or a preassembled glazing unit. A novel method and apparatus for making the sash or fenestration unit may use a double door horizontal booking press with fixed or adjustable molds.

4 Claims, 9 Drawing Sheets

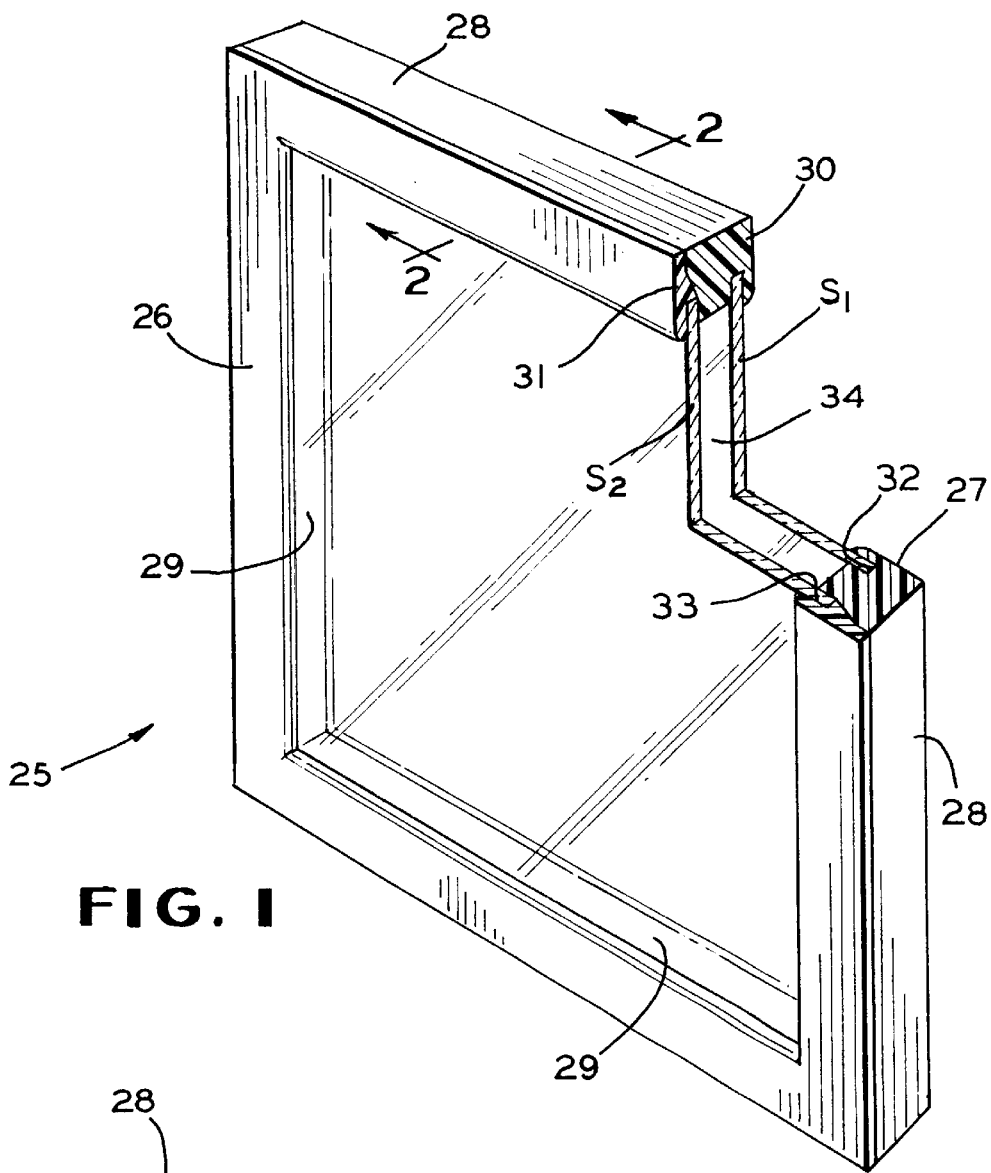
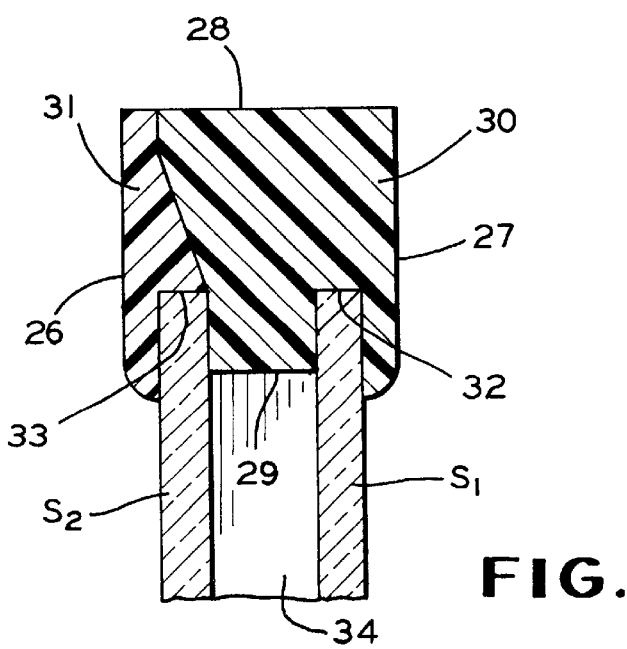

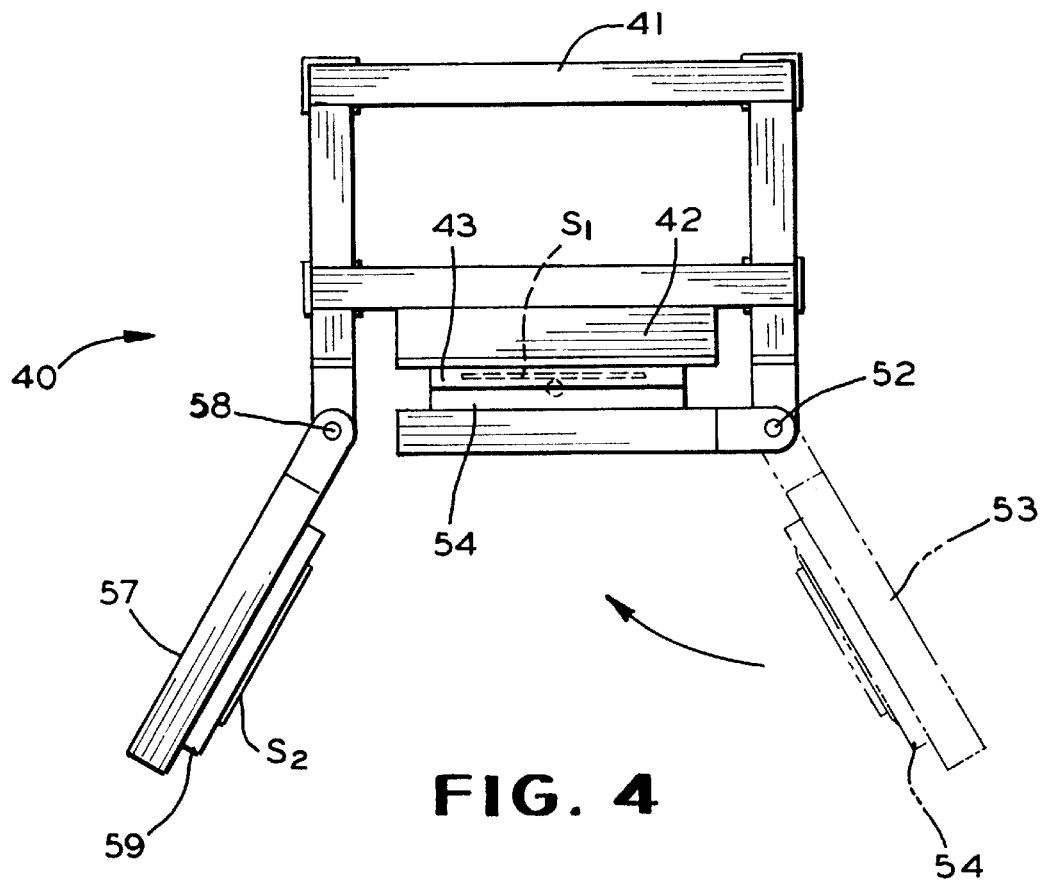
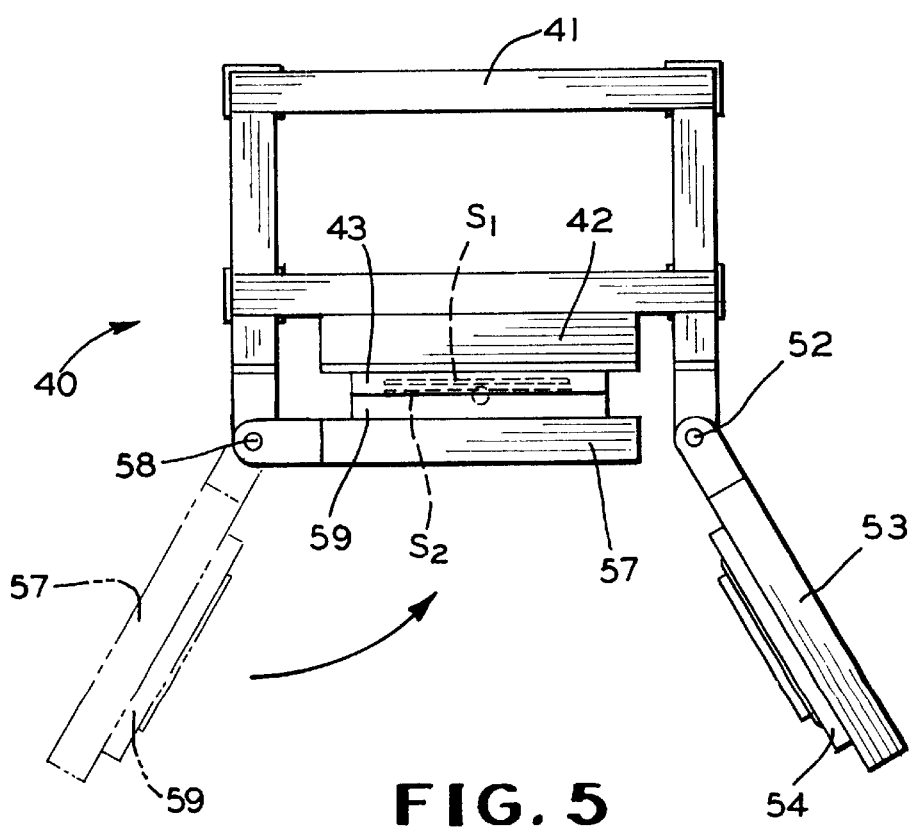

WINDOW SASH CONSTRUCTION AND METHOD AND APPARATUS FOR MANUFACTURE THEREOF

BACKGROUND OF THE INVENTION

1. Field of the Invention

The present invention relates to an improved window sash construction. More particularly, the present invention relates to a homogeneous window sash construction, and a method and apparatus for the manufacture thereof. Most particularly, the present invention relates to a homogeneous window sash construction which holds a pair of glazing in a spaced apart parallel relationship without the necessity for spacers, and a method and apparatus for making the same utilizing a double door horizontal booking press.

2. Discussion of the related art

The present invention is directed to a two step reaction injection molding (RIM) process for fabricating an encapsulated double glazed (DG) sash unit without a prefabricated spacer. Previously the manufacturer of an encapsulated DG unit required two distinct processes. First, the glazing, such as glass sheets, were assembled and, second, they were sealed in a typical insulated glazing operation. The prefabricated insulating glass assembly was then placed in a suitable mold, and an encapsulating frame was formed around the periphery of the assembly.

U.S. Pat. No. 4,219,517 discloses a composite glass and molded frame member. One or more glass panels may be utilized in association with a generally U-shaped elastomeric packing, and a mold-seal strip with thin leg portions engaging the glass. A perimeter frame of urethane plastic material is molded over the pre-assembled glass edge and seal assembly.

U.S. Pat. Nos. 4,822,649 and 4,909,875 show a multiple glazing, a method of obtaining the same, and a device for carrying out the method. The glazing contains two sheets of glass separated by a space of dehydrated air and maintained by a cross-braced frame, of which at least the surface in contact with the glass is butyl and/or polyisobutylene rubber-base mastic and is covered with a peripheral injection which adheres in a cohesive manner to the mastic of the cross-braced frame.

U.S. Pat. No. 4,951,927 discloses an encapsulated multiple glaze structure formed by positioning at least two spaced apart substantially co-extensive sheets of glazing material, wherein the sheets are maintained in an aligned spaced relationship by a suitable spacer element adjacent the peripheral portions of the facing surfaces of the glazing sheets. The above assemblage is then typically placed within the mold cavity of a suitable molding apparatus and a charge of an elastomeric gasket forming material is injected therein to form an encapsulating gasket around the peripheral edge portions of the assemblage to produce a multiple glazed structure.

U.S. Pat. No. 5,061,531 discloses an insulating architectural glass unit for various applications having at least two panes of glass plates separated by an encapsulated air space. The device is constructed with an injection molded frame of relatively low thermal conductivity material. The glass unit has a pair of glass plate sections held apart by aluminum, plastic, or fiber glass separator strips.

All of the above patents show an insulating glass assembly being fabricated in one operation followed by an encapsulation in a second discreet operation.

Two U.K. patents, GB2 245,300 B and GB2 245,861 B disclose the encapsulation of insulating assemblies using modular molds. The molds are comprised of at least one discreet mold structure for each edge of the glass assembly to be encapsulated. In some embodiments disclosed in the '861 patent, and all the embodiments disclosed in the '300 patent, the discreet mold structures are comprised of ridged frame members which are secured to the glass assembly during the encapsulation process to form the finished architectural glazing unit.

The U.K. '861 patent discloses a modular mold process for encapsulating a variety of sizes of insulating glass assemblies. This is accomplished using four independent corner sections and four side sections of length suitable for the assembly being encapsulated.

U.S. Pat. No. 4,470,534 discloses an adjustable frame to accommodate different size glass sheet assemblies in the manufacture of insulating glazing panels. However, no encapsulation is involved.

The PCT Publication WO 99/14169 teaches the manufacture of a multi-panel insulating glazing unit without a prefabricated insulating glass assembly. No encapsulation process is involved in the manufacture.

The above-mentioned patents show various double glazed window assemblies and methods to make the same. The apparatus to make the devices shown often involve large and complicated molding process. This often necessitates the devices being made at a separate plant and shipped for installation. Since all of the above-patents either show an insulating glass assembly being fabricated in one operation, followed by encapsulation in a second discreet operation, or teach the manufacture of an insulating glazing unit without an encapsulation process being involved in the manufacture, those skilled in the art continued to search for a better way of fabricating an encapsulated double glazed sash unit without a prefabricated spacer.

SUMMARY OF THE INVENTION

The aforementioned problems in the art are addressed in accordance with the present invention by the provision of a novel sash structure not hereto found in the prior art, together with a novel method and apparatus for its manufacture. In one of its broad aspects, the present invention is a homogeneous sash which may be made of a wide variety of materials, and holds a first and a second pane of glazing material in a parallel spaced apart relationship without the use of spacers, or a preassembled glazing unit. The use of more than two spaced apart glazing in the sash construction of the present invention is well within the scope of the present invention.

In one embodiment of the present invention, a pair of glass sheets which comprise the insulated glazing assembly are sealed in a spaced apart parallel relationship during the formation of the window sash in a two-step encapsulation project.

In another embodiment of the invention, a mold assembly for forming the sash construction is comprised of three individual sections or mold parts. The first section supports the first glass sheet and cooperates with the second section to define a cavity to produce a first, formed, portion of the window sash. After an initial injection step which encapsulates the peripheral edge of the first glazing to the form the first portion of the unit, the second mold section is removed. A third mold section with a second glazing sheet supported therein is then placed into intimate contact with the first mold section, and the just formed portion of the sash construction. The mold cavity created therebetween defines the second portion of the sash construction. The second glass sheet is positioned in a spaced relationship to the first glazing, and is in sealing contact along its peripheral edge with the first formed portion. The second injection step encapsulates the edge and free side of the second glazing sheet while bonding with the previously formed first portion to complete the sash and the encapsulation process.

In a further embodiment of the invention, an adjustable mold for fabricating a variety of sashes is disclosed. An adjustable fixed mold is provided which may replace the fixed mold in other embodiments of the invention. The adjustable fixed mold has an adjustable mold base with a right angle portion having a first adjustable mold portion and a second adjustable mold portion, and having a portion of a fan gate, sprue, and recess formed therein. A first complementary adjustable mold portion and a second complementary adjustable mold portion, each having a portion of a fan gate, sprue, and recess may be used with the adjustable mold base.

In yet another embodiment of the invention, a method is disclosed of making the improved window sash construction whereby a fixed mold is provided into which a first sheet of glazing is inserted. When a first complimentary mold portion is placed in an intimate 180° opposed or mating contact with the fixed mold portion, a mold cavity is formed about the entire periphery of the glass sheet. When a reaction injection molding material is introduced into the mold cavity so formed, a first formed portion of the window sash construction is formed, encapsulating the first sheet.

The first complimentary mold portion is then removed, and a second complimentary mold portion is placed in a 180° opposed relationship in intimate or mating contact with the fixed mold. The shape of the mold cavity so formed is such that when a reaction injection molding material is introduced into the second mold cavity, the second sheet or pane of glazing will be encapsulated, and a second formed portion of the homogeneous sash will be formed. The second complimentary mold portion is then removed and the window sash construction of the present invention holding a pair of glazing sheets in a spaced apart parallel relationship without the need for spacers or a preformed insulating glazing assembly is produced.

In a still further embodiment of the present invention, a molding apparatus is described which may practice the aforementioned method.

Thus, one of the objects of the present invention is to provide a novel window sash construction.

Another object of the present invention is to provide a molding apparatus which is compact and easily moveable from place to place for forming the improved window sash construction of the present invention.

Another object of the present invention is to provide a method for forming the improved window sash construction of the present invention.

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 1 is a perspective view of a construction embodying the present invention.

FIG. 2 is a sectional view, taken in the direction of the arrows, along the section line 2—2 of FIG. 1.

FIG. 4 is a top plan view of the construction shown in FIG. 3 showing a first door platen in its closed position, and showing a second door platen in its open position.

FIG. 5 is a view similar in part to FIG. 4, but showing a second door platen in its closed position, and showing a first door platen in its open position.

Figure 3:
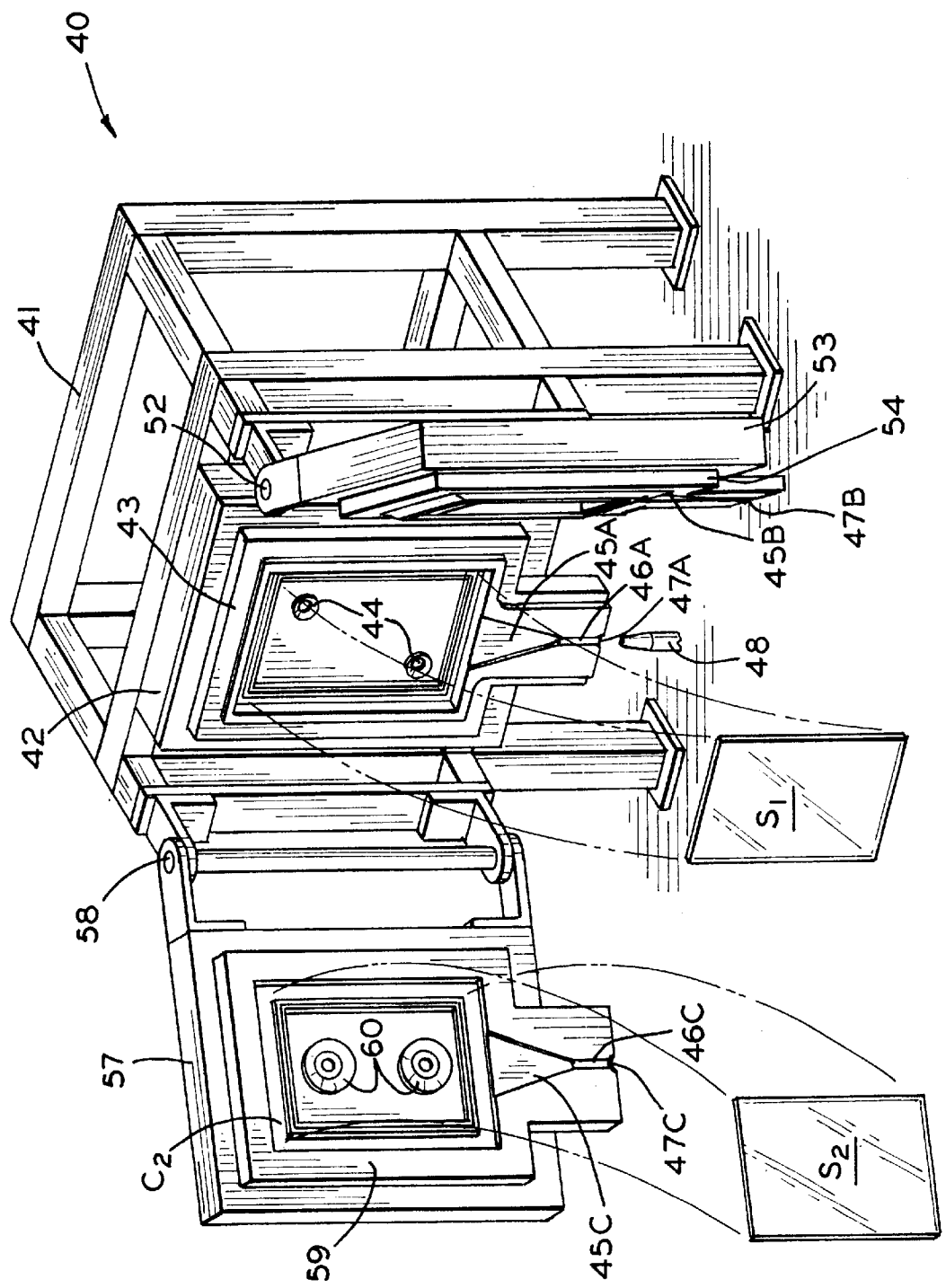
FIG. 3 is a perspective view of a molding apparatus embodying the construction of the present invention.

It is to be understood that the present invention is not limited in its application to the details of construction and arrangement parts illustrated in the accompanying drawings, since the invention is capable of other embodiments, and of being practiced or carried out in various ways within the scope of the claims. Also it is to be understood that the phraseology and terminology employed herein is for the purpose of description, and not of limitation.

DESCRIPTION OF THE PREFERRED EMBODIMENTS

Referring to FIGS. 1 and 2 the improved window sash or fenestration unit of the present invention is illustrated. As an example of the present invention, a window sash 25 is illustrated. Although a rectangular sash is illustrated, as those in the building construction art will appreciate, the sash or fenestration unit 25 can be of any desired shape, such as square, rectangular, round, pentagonal, hexagonal, octagonal, or any other desired shape. The sash 25 is substantially homogeneous throughout. Homogeneous should be understood to mean that the sash is continuous, and of uniform structure or composition throughout. A section taken at any place through the sash will be substantially identical to the same section taken at any other place through the sash.

The sash 25 may be made of one or more materials. The sash will have a front wall 26 and a back wall 27, as well an outer peripheral surface 28 and an inner peripheral surface 29. The sash 25 will have a first formed portion 30, and a second formed portion 31. When completely formed, the sash 25 will have a first sheet $S_1$ of glazing, and a second sheet $S_2$ of glazing. Sheet $S_1$ will be held in first peripheral groove 32, and sheet $S_2$ will be held in second peripheral groove 33, separated by an insulating material 34. The first peripheral groove 32, and the second peripheral groove 33, are formed in the sash 25 by use of the method and apparatus to be described herein below.

Insulting material 34 may be any one of a wide variety of insulating materials known in the art, such as a vaporous material, an argon gas, a dead air space, and inert gases, or the like. The glazing ($S_1$, $S_2$) may be frangible or non-frangible materials such as glass, acrylic resin, polycarbonate, or other materials known in the art. The glazing material may be transparent, translucent, light blocking, or solid, depending upon the intended use for the sash 25.

Referring now to FIGS. 3–5, there is shown an apparatus embodying the construction of the present invention. Illustrated in FIG. 3 is a double door horizontal booking press, indicated generally by the numeral 40. Press 40 includes a frame 41, generally of a parallelipiped nature. To the front of frame or support 41 is mounted a fixed mold platen 42. A fixed mold 43 having a first portion of mold cavity C1 (FIG. 7) formed therein, is affixed to the fixed mold platen 42. A pair of vacuum heads 44 aides in holding a first sheet or pane $S_1$ in the fixed mold 43 for purposes to be described.

Fixed mold 43 also has a first portion 45A of a fan gate 45, a first portion 46A of sprue 46, and first portion 47A of recess 47 to accept a portion of a nozzle 48 which is used to inject molding material into the mold cavity $C_1$.

Rotatably mounted to frame 41, by first hinge 52, is first door platen 53. First complimentary mold 54 is mounted, attached or connected to first door platen 53. First complementary mold 54 has a second portion 45B of fangate 45, a second portion 46B of sprue 46, and a second portion 47B of recess 47 formed therein. First door platen 53 may travel from an open position, which may be as illustrated in phantom lines in FIG. 4, to the closed position, illustrated in solid lines.

In the closed position of the first door platen 53, the first complimentary mold 54 has been brought from a position rotated away from the fixed mold 43, to a position in a 180° opposed relationship to fixed mold 43, and first complimentary mold 54 is in intimate or mating contact with fixed mold 43 such that the mold cavity $C_1$ (FIG. 11) is sealed and ready to accept a molding material.

Figure 9:
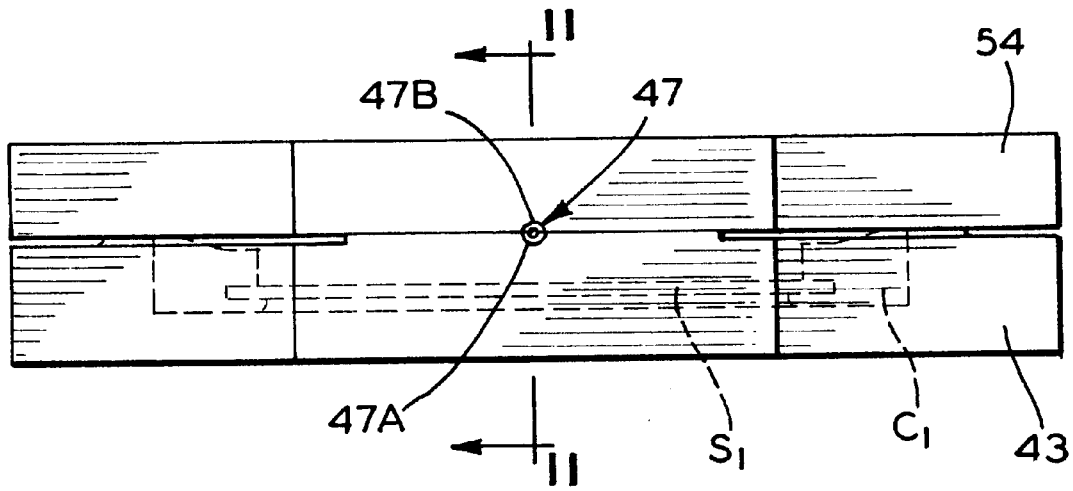
FIG. 9 is a bottom plan view showing a fixed mold and a first complimentary mold in intimate or mating contact, in a 180° opposed relationship, as illustrated in FIG. 4.
Figure 10:
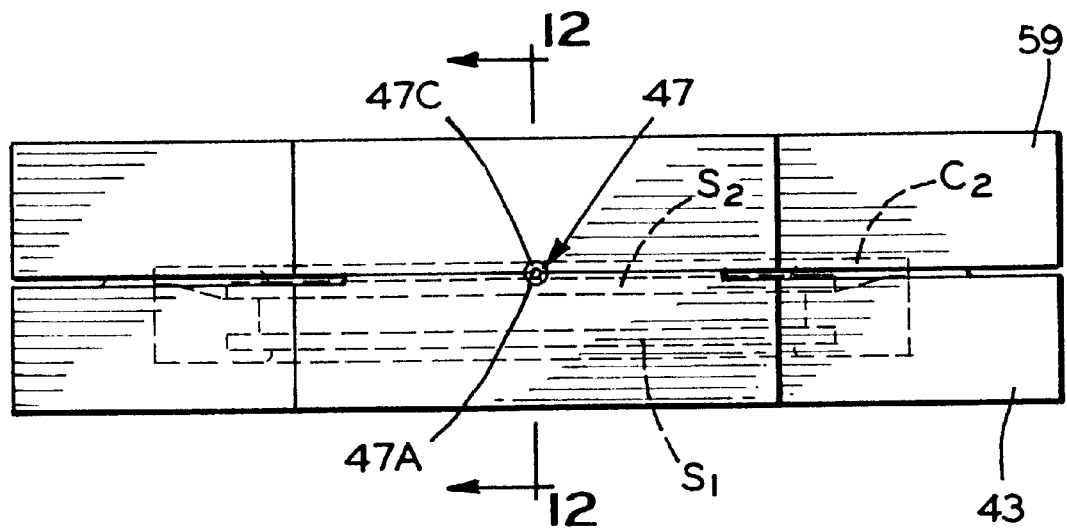
FIG. 10 is a bottom plan view showing a fixed mold and a second complimentary mold in intimate or mating contact, in a 180° opposed relationship, as illustrated in FIG. 5.

As shown in FIG. 9, first sheet or glazing $S_1$ is contained between the fixed mold 43 and the first complementary mold 54. While first complementary mold 54 is in its closed position, second door platen 57, rotatably mounted to frame 41 by second hinge 58, is in its open position.

Second door platen 57 has attached, mounted or connected thereto second complementary mold 59. Second complementary mold 59 has a portion of mold cavity $C_2$ provided therein. A pair of second vaccum heads 60 will hold second sheet or pane $S_2$ in a fixed relationship to mold cavity $C_2$. Second complementary mold 59 has a third portion 45C of a fan gate 45, third portion 46A of sprue 46, and third portion 47A of recess 47 provided therein.

Referring to FIG. 5, after a first molding operation forms a first formed portion 30 of sash 25, first door platen 53 will be rotated about first hinge 52 (shown in phantom lines in FIG. 4) from its closed position to its open position (shown in FIG. 5 in solid lines). After this occurs second door platen 57 will be rotated about second hinge 58 from its open position (shown in phantom lines in FIG. 5) to its closed position shown in solid lines.

Figure 12:
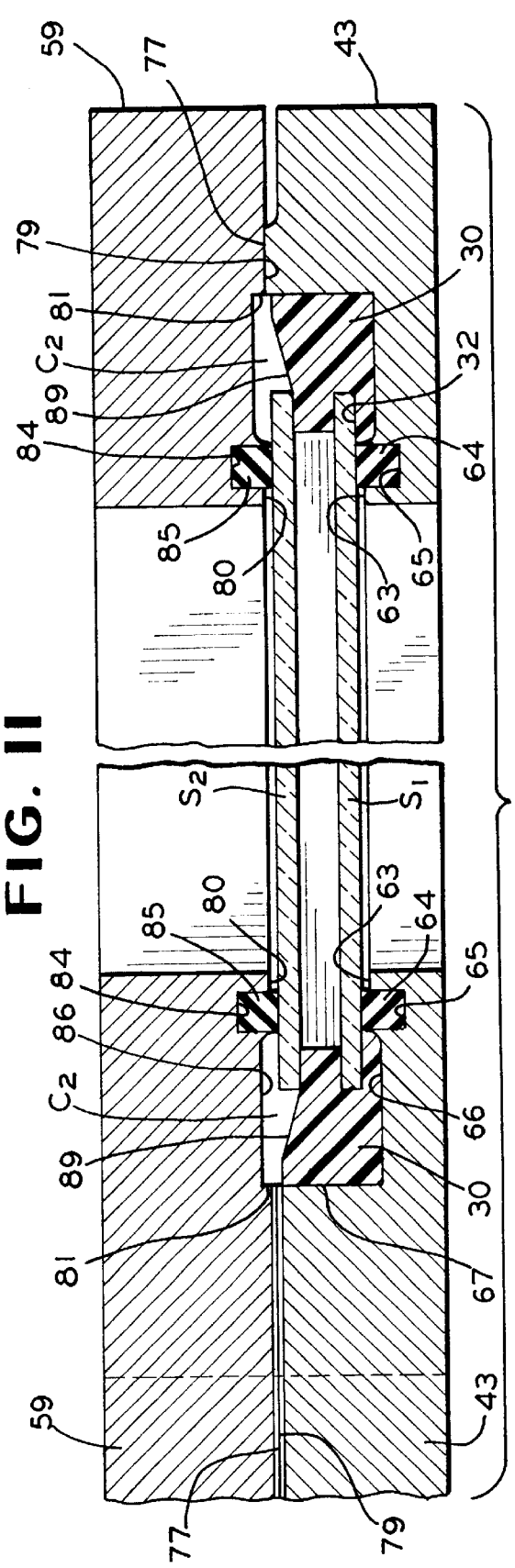
FIG. 12 is a sectional view, taken in the direction of the arrows, along the section line 12—12 of FIG. 10.

With second door platen 57 in its closed position, second complementary mold 59 is now in a 180° opposed relationship to fixed mold 43, and in close, mating, or intimate contact therewith to form mold cavity $C_2$ (FIG. 12). First portion 45A of fan gate 45 joins with third portion 45C to form a complete fan gate 45, while third portion 46C of sprue 46 joins with first portion 46A of sprue 46 to form a complete sprue 46, and third portion 47C of recess 47 joins with first portion 47A of recess 47 to form complete recess 47. Recess 47 is in fluid communication with sprue 46 and fan gate 45 to form a flow path to mold cavity $C_2$.

Injection molding material is introduced into cavity $C_2$ to form the remainder of sash 25. As can be seen from the dotted lines in FIG. 5, sheets ($S_1$, $S_2$) are contained entirely between the fixed mold 43 and the second complementary mold 59.

First door platen 53 and second door platen 57 are rotated between their open and closed positions by mechanisms well known in the art. Any practical mechanism, including mechanisms utilizing fluid cylinders may be used in the present invention. Suitable control means, and fluid supply means, also known in the art, will be provided.

Figure 7:
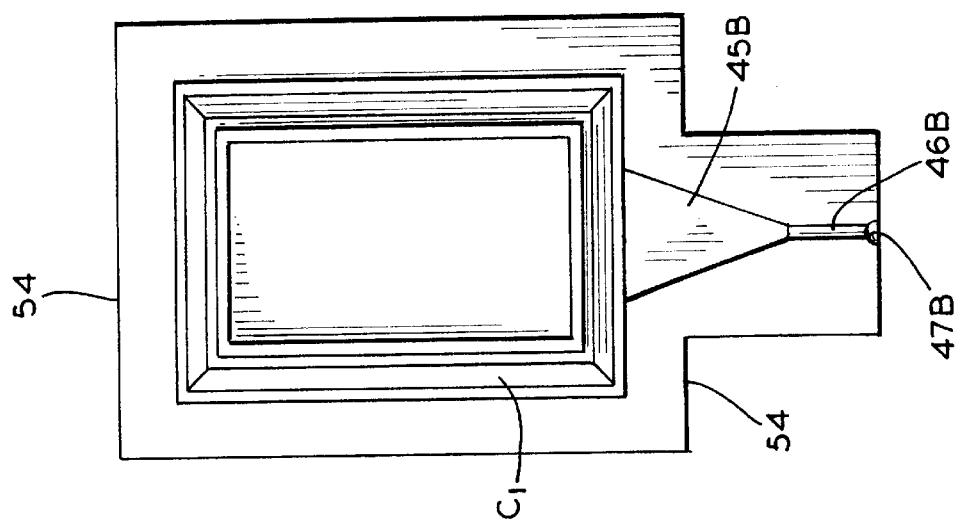
FIG. 7 is an elevational view of a first complementary mold.
Figure 6:
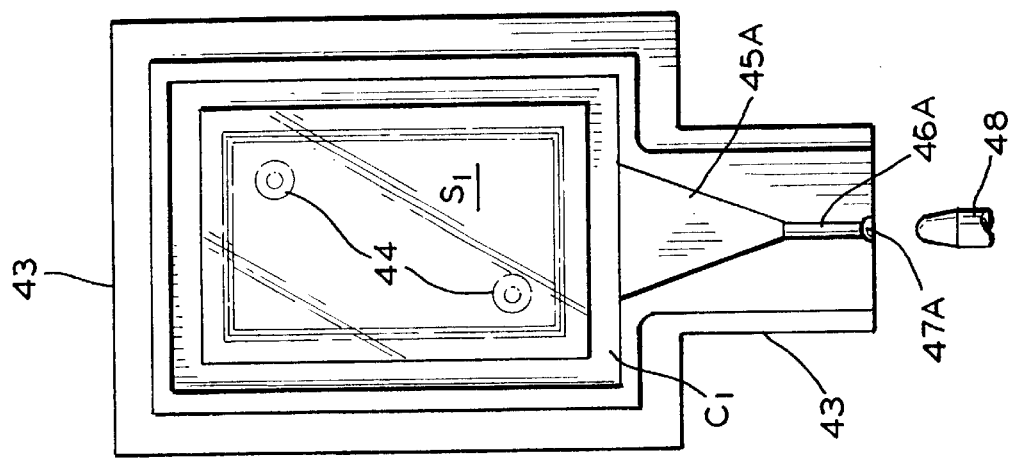
FIG. 6 is an elevational view of a fixed mold.
Figure 8:
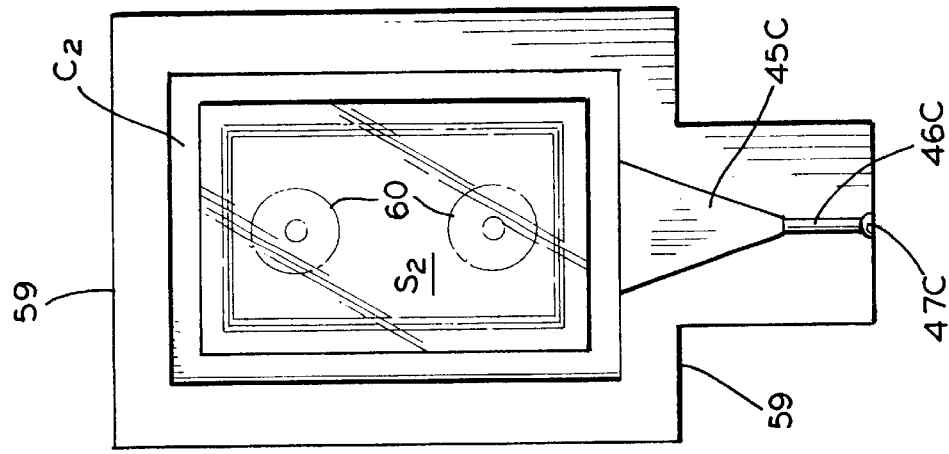
FIG. 8 is an elevational view of a second complementary mold.

Referring now to FIGS. 6–12 the molds utilized by the molding apparatus may be seen in greater detail. FIGS. 6–8 show elevational views of the fixed mold 43, the first complementary mold 54, and the second complementary mold 59. These molds are arranged in the relationship shown in FIG. 3. In other words, fixed mold 43 is in the center, first complementary mold 54 is on the right, and second complementary mold 59 is on the left. The fixed mold 43 forms a portion of the mold cavity $C_1$, and contains a parametrical mold surface 63, a first gasket 64 mounted in a first gasket groove 65, a front wall molding surface 66, and a first portion of an outer peripheral mold surface 67.

The balance of the mold cavity $C_1$ is formed in the first complementary mold 54. First complementary mold 54 includes a second parametrical mold surface 72, inner peripheral wall mold surface 73, and intermediate mold surface 74. Therefore, mold cavity $C_1$ is formed by first sheet $S_1$, front wall mold surface 66, first portion of outer peripheral mold surface 67, intermediate mold surface 74, and inner peripheral wall mold surface 73.

In accordance with the method of the present invention, the first formed portion 30 of sash 25 is formed by placing a first sheet $S_1$ of glazing into the fixed mold 43 with the aid of vacuum heads 44. Locating means (not shown) well known in the art will properly center the first sheet $S_1$. Sheet $S_1$ may be centered on first gasket 64.

Figure 11:
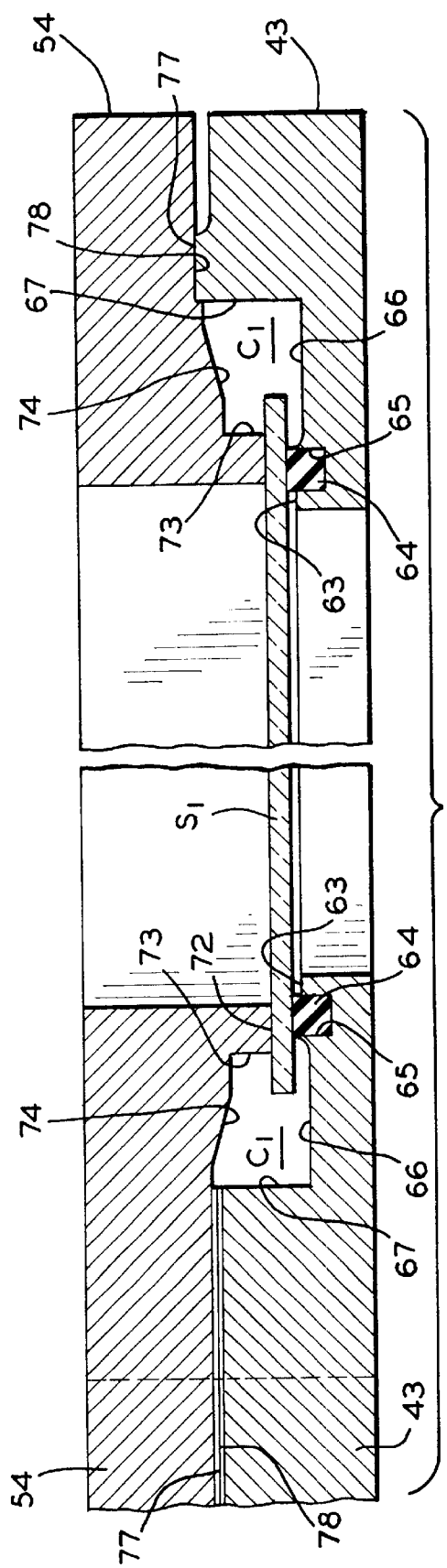
FIG. 11 is a sectional view, taken in the direction of the arrows, along the section line 11—11 of FIG. 9.

After sheet $S_1$ is properly located in fixed mold 43, the first complementary mold 54 is rotated to its closed position, as shown in FIGS. 5 and 11. The second parametrical mold surface 72 will contact the top surface of the first sheet $S_1$ of glazing, and the first complementary mold mating surface 78 will be in contact with the fixed mold mating surface 77, thus forming mold cavity $C_1$.

A RIM injection molding material in the present process requires a hot runner. PVC pressures can be dangerouly high for the flexible hoses needed to provide for hot runners, and such pressures can harm the edges of the glass, which can lead to a defective product. However, PVC is less expensive and has been used in the field for a number of years. In order to reduce these high pressures, the use of urethane in the present invention is preferred. However, urethane is relatively expensive. In order to make the use of urethane less expensive, it is contemplated that fillers may or may not be used, and a hollow molding technique may be desirable to bring the cost down. Likewise the process may, or may not, use a dessicant, and may, or may not, use an inert gas to fill the space between the panes ($S_1$,$S_2$).

The second step in the molding process may be seen with reference to FIG. 12. The fixed mold 43, having the first formed portion 30 of the sash 25 formed in situ, will remain stationary. The first complementary mold 54 will be rotated away from the fixed mold, and the second complementary mold 59 will be rotated into an intimate or mating contact with the fixed mold, as previously described.

Second complementary mold 59 has a second complementary mold mating surface 79 which is in intimate or mating contact with the fixed mold mating surface 77. A second portion of an outer peripheral mold surface 81 is provided flush with the first portion of the outer peripheral mold surface 67 on the second complementary mold 59. The first and second portions (67, 81) of the outer peripheral mold surface will cooperate to form the outer peripheral surface 28 of the sash 25.

Also provided in the second complementary mold 59 are a second gasket groove 84, which holds a second gasket 85. Second gasket 85 bears against the surface of the second sheet $S_2$ of glazing which was placed in the mold and held in place with the aid of the vacuum head 60, as described in connection with FIG. 8. Adjacent second gasket 85 is a back wall molding surface 86. The second mold cavity $C_2$ is formed by the top of the first formed portion 30 of the sash 25 as indicated by the numeral 89. Thus, the second mold cavity $C_2$ comprises surface 89, second portion of the outer peripheral mold surface 81, and the back wall molding surface 86.

The second step of the molding process includes injecting into cavity $C_2$ a rim injection molding material which is the same as, or different from, the rim injection molding material used to form the first formed portion 30 of sash 25. The material for the both the first formed portion 30 and second formed portion 31 will be selected based on the intended use of the particular sash being manufactured, and may include such factors as ambient temperatures, mean temperatures, dewpoints, and the like.

The second portion 31 of the sash 25 must be molded in place shortly after the first portion to get a chemical bonding, and prevent moisture leak, which could cloud the inner surfaces of panes ($S_1$,$S_2$). Preferably, no mold release would be used on the top surface of the first formed portion 30 of the sash 25 before the second formed portion 31 was molded in place. After a suitable waiting time, the second complementary mold 59 would be rotated to its open position as illustrated in FIG. 5, and the completed sash 25 would be removed.

To facilitate the molding process, the first sheet of glazing $S_1$ may be be primed before it is placed in the base mold. Mold release would not be placed on the top surface of the first formed portion 30 of the sash 25, but mold release can be placed on the second sheet of glazing $S_2$.

Thus, in operation, the double door horizontal booking press 40 would initially have first door platen 53, and second door platen 57, both in their open position. A first sheet of glazing $S_1$ would be placed into the fixed mold 43 with the aid of vacuum heads 44. First door platen 53 would be rotated to its closed position, bringing first complementary mold 54 into intimate or mating contact with fixed mold 43, and the injection nozzle 48, connected to a source of injection material well known in the art, would be moved into contact with recess 47. The rim injection molding material would travel from nozzle 48 through sprue 46 and fan gate 45 to completely fill mold cavity $C_1$, and completely surround the edge of sheet $S_1$.

While waiting a suitable curing time for the first molding operation, a second sheet or pane of glazing $S_2$ would be placed into the second complementary mold 59, properly located, and held in place with the aid of vacuum heads 60. First door platen 53 will be rotated to its open position shown in the phantom lines in FIG. 4, and the first formed portion 30 of sash 25 will have been molded in place in fixed mold 43.

The second door platen 54, with second sheet of glazing $S_2$ already in place, will be rotated to its closed position in intimate or mating contact with base mold 43. Nozzle 48 will once again be brought into place in recess 47, and the desired molding material will enter mold cavity $C_2$ through sprue 46 and fan gate 45 to form the second formed portion 31 of the sash 25. After a suitable curing time, the second door platen 57 will be opened, and the completed sash 25 will be removed.

Figure 13:
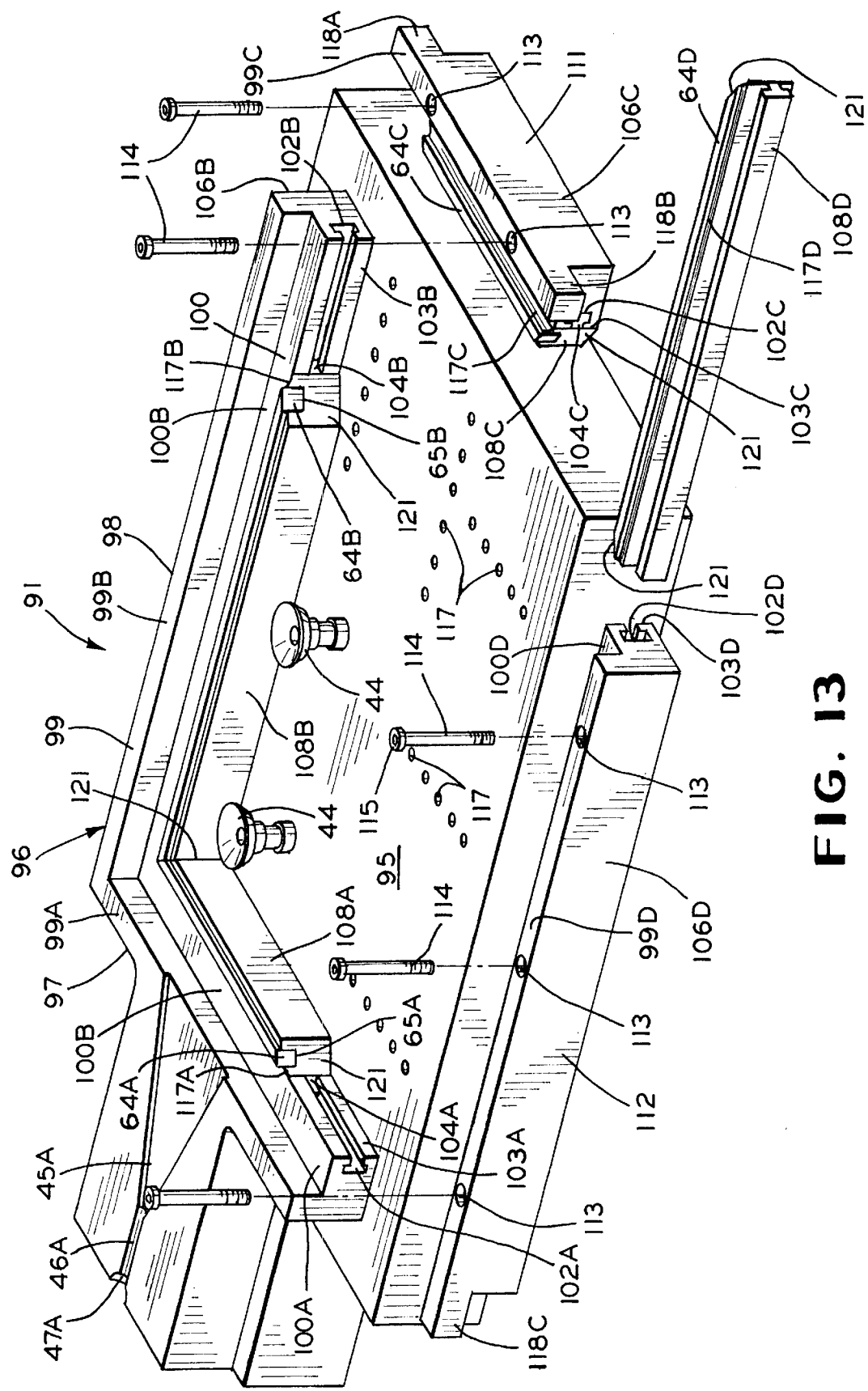
FIG. 13 is a perspective view of an adjustable fixed mold.
Figure 14:
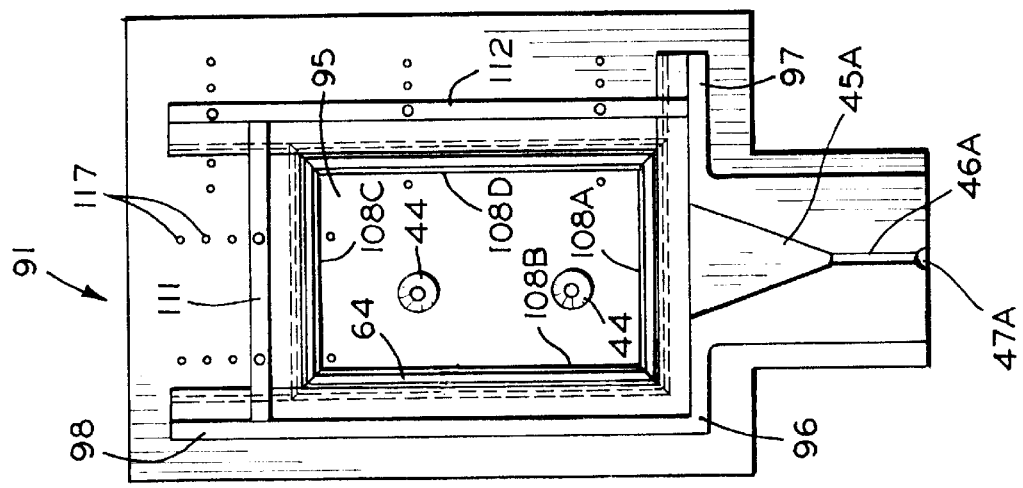
FIG. 14 is an elevational view of the construction shown in FIG. 13.

To provide for molding of various sizes of sashes 25 without needing a separate mold for each size sash desired, adjustable molds are provided. Referring to FIGS. 13 and 14, the adjustable fixed mold 91 will first be described. Adjustable fixed mold 91 includes an adjustable mold base 95, to which is fixedly attached a right angle mold portion 96 having a first adjustable mold portion 97, and a second adjustable mold portion 98. Right angle mold portion 96 has a top wall 99 having a first portion 99A and a second portion 99B, in which a groove or recess 100 is formed. Recess 100 has a first portion 10A, and a second portion 100B.

First adjustable mold portion 97 has formed therein a first mold insert groove 102A in first sidewall 103A, while second adjustable mold portion 98 has formed therein a second mold insert groove 102B. First mold insert groove 102A accepts first tongue 104A of first mold insert 108A. First mold insert 108A has a first portion 65A of gasket groove 65 formed therein, which carries a first portion 64A of gasket 64 therein. First mold insert 108A has a first portion 117A of curved surface 117 formed thereon, which corresponds to the curved portion of the front wall mold surface 66 (FIG. 11).

Second adjustable mold portion 98 has second mold insert groove 102B formed in second side wall 103B which accepts second tongue 104B of second mold insert 108B. Second mold insert 108B has a second portion 65B of gasket groove 65 formed therein to accept a second portion 64B of gasket 64.

Third adjustable mold portion 111, and fourth adjustable mold portion 112, unlike first adjustable mold portion 97, and second adjustable mold portion 98, are not fixed. They are adjustable with respect to the right angle mold portion 96. Third adjustable mold portion 111, and fourth adjustable mold portion 112, have a plurality of aperatures 113 to accept fasteners 114, such as threaded bolts 115, which can be threaded into threaded mounting holes 117. It can be seen that third adjustable mold portion 111 can be adjusted to a variety of predetermined desired positions parallel to first leg portion 97, and that fourth adjustable portion 112 can be, likewise, adjusted to a series of predetermined desired positions with respect to second leg portion 98.

The third adjustable mold portion 111 has formed thereon third front wall 103C, third top wall 99C, and third back wall 106C. Third front wall 103C has formed therein third mold insert groove 102C.

Third mold insert 108C has third tongue 104C which fits in third mold insert groove 102C. Third gasket 64C fits in third gasket groove 65C of third mold insert 108C. Third curved portion 117C (FIG. 18) completes the third mold insert 64C and forms part of the third front wall mold surface 66C.

To enable the third adjustable mold portion 111C to mate with the second adjustable mold portion 98, and the fourth adjustable mold portion 112, the third adjustable mold portion 111 has a first protrusion 118A which fits in the second groove or recess 100B in the top wall 99B of second adjustable mold portion 98 and a second protrusion 118B which will fit in the fourth groove or recess 100D in the fourth adjustable mold portion 112. It can be seen that the first protrusion 118A may slide back and forth in the second groove or recess 100B, and the second protrusion 118B may slide back and forth in the fourth groove or recess 100D. The dimensions of the right angle mold portion 96, the related first insert 108A, and second mold insert 108B are carefully chosen, together with the placement of the threaded mounting holes 117, so that the third mold insert 108C can be brought into abutting contact with the second mold insert 108B at the adjoining mitered surfaces 121 to provide for continuity of the adjustable fixed mold 91.

The construction of the fourth adjustable mold portion 112 is substantially similar to that of the third adjustable mold portion 111, except that one end of fourth adjustable mold portion 112 is square, while the other end has a third protrusion 118C much like the second protrusion 118B on the third adjustable mold portion 111. Third protrusion 118C slides in first groove portion or recess 100A, and allows the fourth adjustable mold portion 112 to be moved toward and away from the second adjustable mold portion 98. As with the third adjustable mold portion 111, the fourth adjustable mold portion 112 has a plurality of apertures 113 to accept fasteners 114, such as threaded bolts 115.

With fourth mold insert 108D in place in the fourth mold insert groove 102D, the fourth adjustable mold portion 112 would be placed in position parallel to the second adjustable mold portion 98, with mitered surface 121 of fourth mold insert 108D contacting mitered surface 121 of first mold insert 108A. Threaded bolts 114 would then be placed into the apertures 113 in the fourth adjustable mold 112, and threaded into the appropriate threaded mounting holes 117. Thereafter, the third adjustable mold portion 111, with third mold insert 108C in position would be slid along with second protrusion 118B riding in fourth groove or recess 100C and second protrusion 118A running in second groove 100B until the mitered surfaces 121 at each end of third mold insert 108C contact the mitered surfaces 121 of second mold insert 108B and fourth mold insert 108D. At this time, the adjustable base mold 91 would be completely assembled and ready for use.

Figure 15:
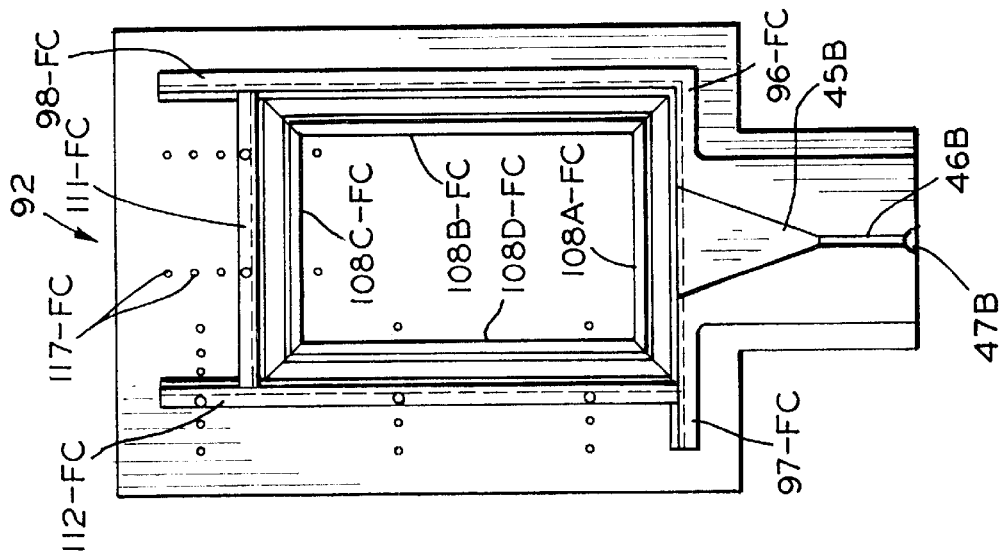
FIG. 15 is an elevational view of an adjustable first complimentary mold.
Figure 16:
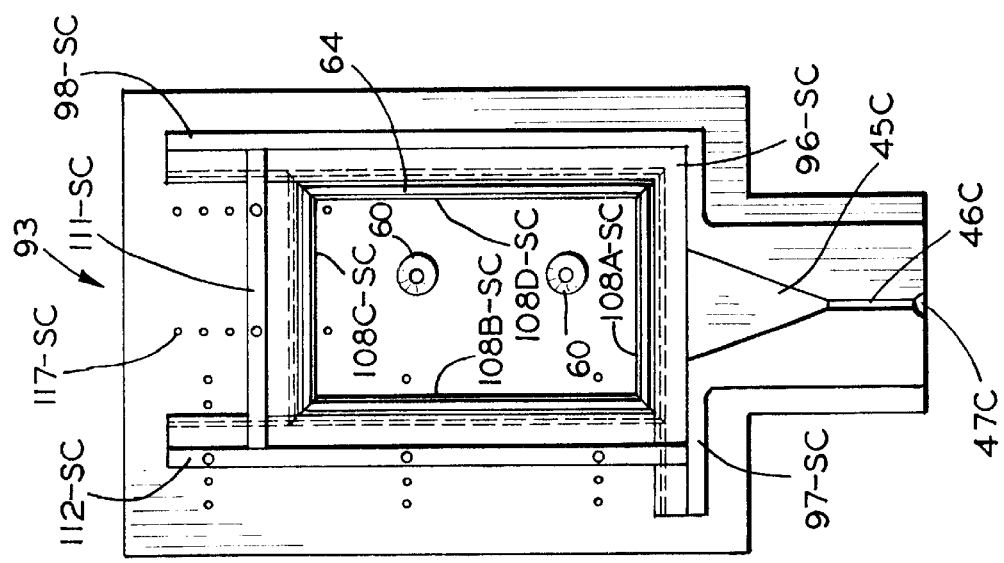
FIG. 16 is an elevational view of an adjustable second complimentary mold.
Figure 17:
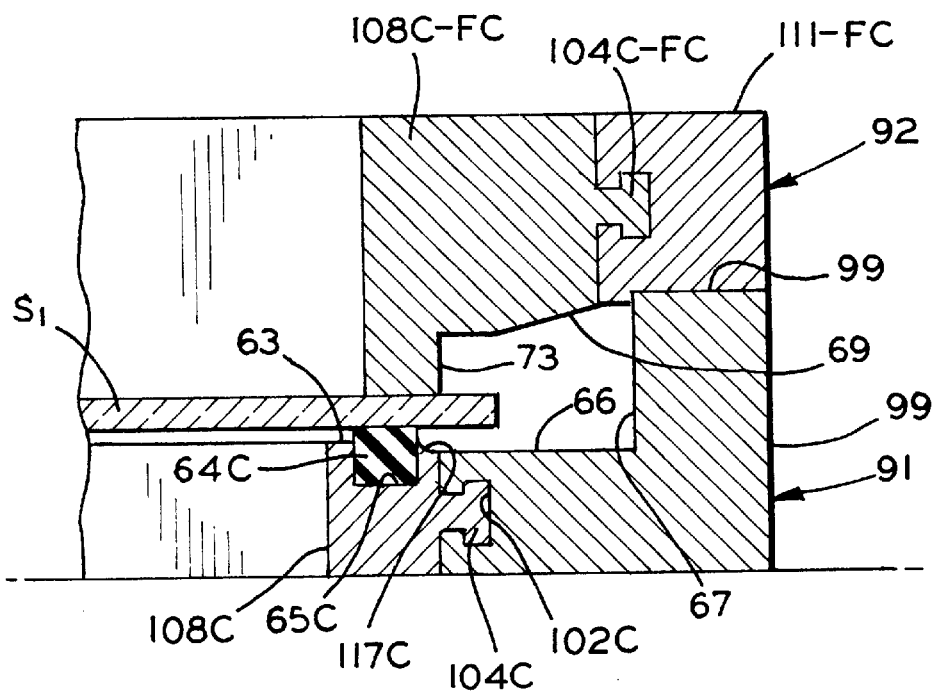
FIG. 17 is a view, similar in part to FIG. 11, but showing the use of an adjustable fixed mold and an adjustable first complimentary mold.
Figure 18:
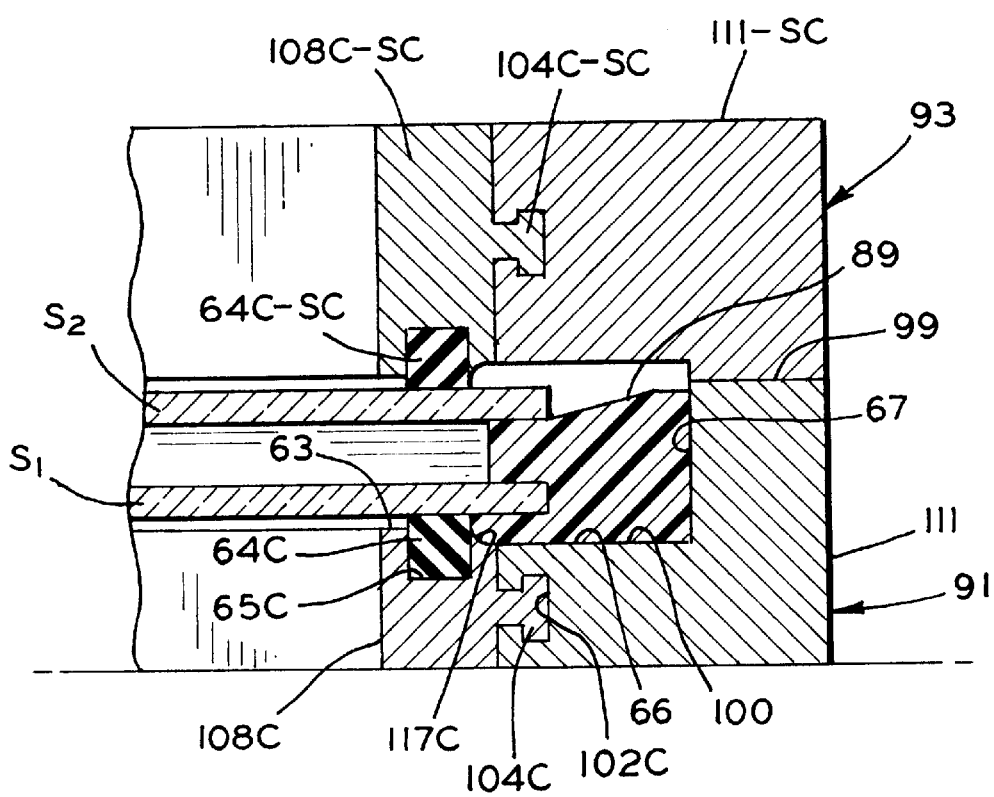
FIG. 18 is a view similar in part to FIG. 12, but showing the use of an adjustable fixed mold and an adjustable second complimentary mold.

Referring to FIG. 14, the adjustable fixed mold 91 can be seen in an elevational view with corresponding parts indicated by like numerals. The construction of the adjustable complementary mold 92 is shown in FIG. 15, and the construction of the adjustable second complementary mold 93 is shown in FIG. 16. The construction of adjustable first complementary mold 92 and adjustable second complementary mold 93 are very similar to the adjustable fixed mold 91. Only the profiles and/or cross-sections of the parts differ, as can be seen in FIGS. 17 and 18. Therefore, the portions of the first complementary mold 92 are indicated by numerals identical to those used in describing adjustable base mold 91, with the addition of the prefix "FC" to indicate they are in the adjustable first complementary mold. For example, third adjustable mold portion 111 of adjustable fixed mold 91 is indicated as 111-FC in FIG. 15, which shows the adjustable first complementary mold 92, and 111-SC in FIG. 16, which shows the adjustable second complementary mold portion 93. The third leg portion 108C in FIG. 14 is indicated as 108C-FC in FIG. 15, and 108C-SC in FIG. 16.

It can be seen that the operation and method of the present invention with the adjustable mold portions 91–93 is substantially identical to that with the fixed mold portions shown in FIG. 3. When the adjustable first complementary mold 92 is rotated 180 degrees and brought into mating contact with adjustable fixed mold 91 this will be comparable to closing the first door platen 53 and bringing the first complementary mold portion 54 into contact with fixed mold 43. When second adjustable complementary mold portion 93 is rotated 180 degrees and brought into contact with adjustable fixed mold 91, this will be comparable with closing second door platen 57, and bringing second complementary mold 59 into position against fixed mold 91. The adjustable fixed mold 91 may be mounted in substantially the same location as the fixed mold 43, while the adjustable first and second complementary molds (92, 93) may be mounted in substantially the same position as the first and second complementary molds (54, 59) on first and second door platens (53, 57). As shown in FIG. 17 and 18, mold cavity C1 is formed by the first sheet of glazing $S_1$, the adjustable base mold 91, and first adjustable complementary mold 92, with the various parts thereof being as indicated.

FIG. 18 shows that the mold cavity C2 is formed by the first formed portion 30 of sash 25, the first sheet of glazing $S_1$, the adjustable second complementary mold 93, and its various parts as indicated, as well as second sheet of glazing $S_2$.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An adjustable mold apparatus for making a window sash comprising:
   A) a mold base, said mold base having a plurality of mounting holes for accepting a lesser plurality of fasteners;
   B) a right angle mold portion permanently affixed to said mold base, said permanently affixed right angle mold portion including as a part thereof:
      i) a first mold portion, said first mold portion having:
         a) a first top wall,
         b) a first front wall,
         c) an essentially "L" shaped first recess, formed in said first top wall and said first front wall,
         d) a first mold insert groove formed in said first front wall,
         e) a first mold insert capable of sliding movement located in said first mold insert groove,
         e) a first bottom wall,
         f) a first back wall,
         h) at least a first portion of a sprue, and
         i) at least a first portion of a fan gate formed in said first top wall,
      ii) a second mold portion abutting and extending essentially at a 90° angle to said first mold portion, said second mold portion having:

a) a second top wall,
b) a second front wall,
c) an essentially "L" shaped second recess, formed in said second top wall and said second front wall,
d) a second mold insert groove formed in said second front wall,
e) a second mold insert capable of sliding movement located in said second mold insert groove and abutting said first mold insert,
f) a second bottom wall, and
g) a second back wall;

C) a third mold portion capable of adjustable attachment to said mold base, said third mold portion including:
i) a third top wall,
ii) a third front wall,
iii) an essentially "L" shaped third recess formed in said third top wall and said third front wall,
iv) a third mold insert groove formed in said third front wall,
v) a third mold insert capable of sliding movement located in said third mold insert groove and abutting said second mold insert,
vi) a third bottom wall, and
vii) a third back wall; and D) a fourth mold portion capable of adjustable attachment to said mold base, said fourth mold portion including:
i) a fourth top wall,
ii) a fourth front wall,
iii) an essentially "L" shaped fourth recess formed in said fourth top wall and said fourth front wall,
iv) a fourth mold insert groove formed in said fourth front wall,
v) a fourth mold insert capable of sliding movement located in said fourth mold insert groove and abutting contact with said first and said third mold inserts,
vi) a fourth bottom wall, and
vii) a fourth back wall;

E) wherein when said first, second, third and fourth mold inserts are brought into abutting contact, they form at least a portion of a mold cavity.

2. The adjustable mold apparatus of claim 1, further comprising:
A) a frame having said mold base attached thereto;
B) at least two vacuum heads holding a sheet of glazing between said mold portions, said vacuum heads attached to said mold base;
C) a door platen rotatably mounted to said frame; and
D) a complementary mold attached to said door platen, said complementary mold including:
i) at least a portion of a second sprue, and
ii) at least a portion of a second fan gate;
E) wherein said door platen is capable of being rotated into a closed position in a substantially 180 degrees opposed intimate relationship with said mold portions, thus defining and sealing at least a portion of a mold cavity therebetween.

3. The adjustable mold apparatus of claim 2, further comprising:
A) a second door platen rotatably mounted to said frame; and
B) a second complementary mold attached to said second door platen, said second complementary mold including:
i) at least a portion of a third sprue, and
ii) at least a portion of a third fan gate;
C) wherein said second door platen is capable of being rotated into a closed position, when said first door platen is in an open position, and placed in a substantially 180 degrees opposed intimate relationship with said mold portions, thus defining at least a portion of a second mold cavity therebetween.

4. The adjustable mold apparatus of claim 3, further comprising:
at least two second vacuum heads holding a second sheet of glazing in a fixed relationship to said second mold cavity, said second vacuum heads attached to said second door platen.

* * * * *